Feb. 28, 1956 P. H. McMURRAY 2,736,567
AUXILIARY DEMOUNTABLE WHEELS FOR MOVING VEHICLE
AT RIGHT ANGLES TO MOVEMENT BY PERMANENT WHEELS
Filed April 10, 1953
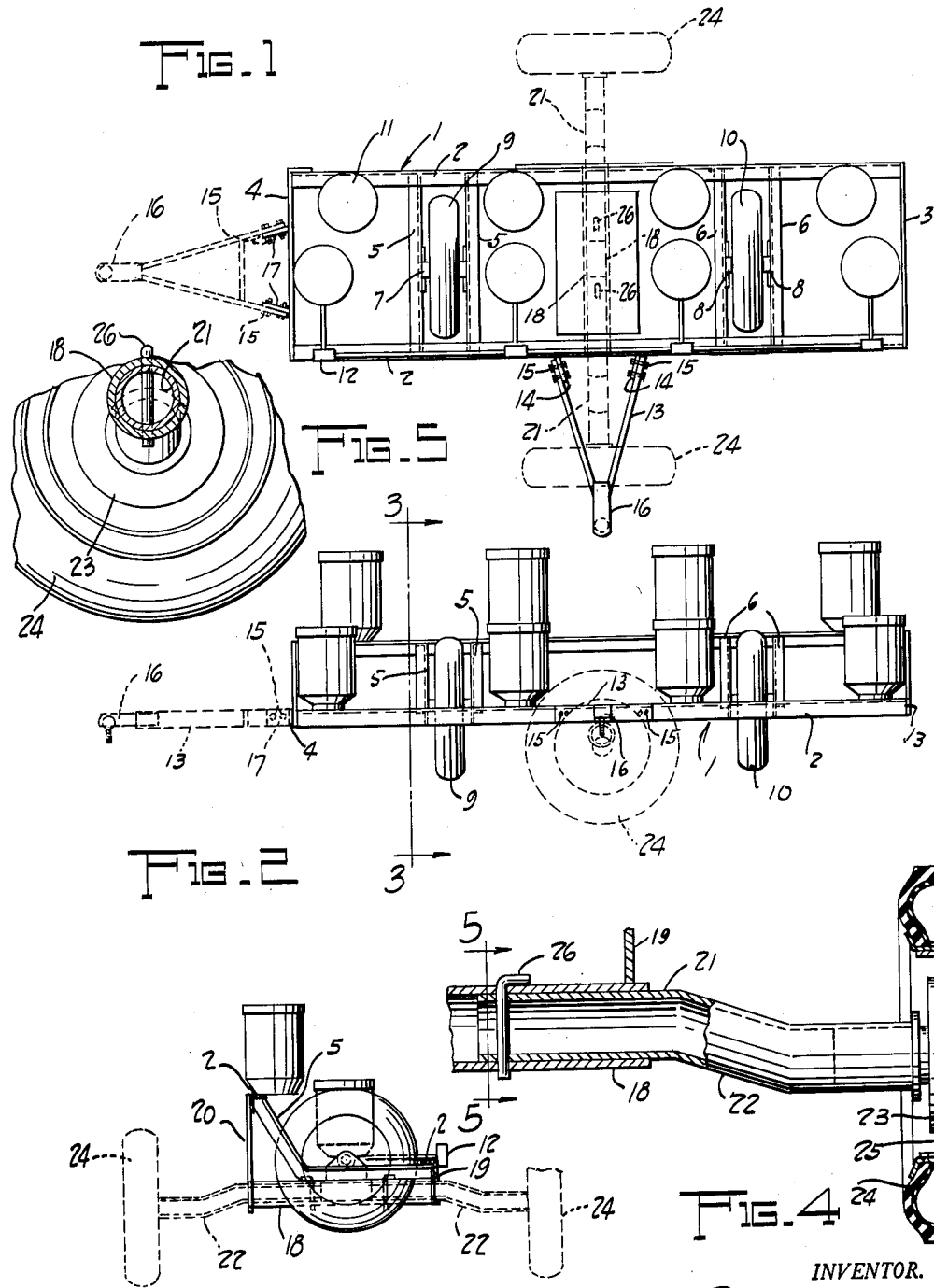
INVENTOR.
Paul H. McMurray
BY Robb & Robb
attorney _United States Patent Office_

2,736,567
Patented Feb. 28, 1956

2,736,567

AUXILIARY DEMOUNTABLE WHEELS FOR MOVING VEHICLE AT RIGHT ANGLES TO MOVEMENT BY PERMANENT WHEELS

Paul H. McMurray, Delphi, Ind., assignor to Delphi Products Company, Incorporated, Delphi, Ind., a corporation Application April 10, 1953, Serial No. 348,064

2 Claims. (Cl. 280—34)

This invention relates to improvements in means for transporting farm implements primarily.

In particular, this invention is directed to the provision of suitable means for enabling the transport of farm implements over the highway, which implements are probably too wide or otherwise prohibited by law from being moved, in view of the fact that they might obstruct said highway.

While farm implements are usually provided at the present time with suitable wheels, generally rubber-tired, in certain cases the wheels and the associated parts of the frame which support the implement operating instrumentalities are so arranged that the machine must be normally moved in use in the field in a manner which does not permit the subsequent movement of the vehicle over a highway or the like. Thus, heretofore, such implements have of necessity been moved from place to place along the road by means of a trailer upon which the implements may be carried and, thus, the requirement for an additional piece of equipment is present.

The principal object of this invention is to provide for the normal arrangement of the parts, whereby provision of simple, additional wheel elements may be made and readily attached to an implement so as to permit the transport of such implement over the highway as required.

A further object of the invention is the provision of an attachment, involving the use of wheels which may be secured to the implement in order to enable the movement of the same in a different direction from that which would normally be the case, so as to avail of the different dimensional conditions which exists.

A more particular object of the invention is to provide normal means for transporting a machine which involves a frame, normally moved in one direction during its use as a farm implement, and an attachment for such machine which will enable the movement of the machine in another direction from place to place without obstructing travel or traffic on a road or highway.

A still further object of the invention is to provide in a machine which is of substantially great width, normally supported on wheels for movement in the direction of its width, with suitable means for permitting the implement to be moved lengthwise without necessitating the provision of a separate trailer vehicle and without substantially requiring any re-arrangement of the normal elements of the implement in order to carry out the said object.

A still further object of the invention is to provide an implement involving the use of suitable towing means normally availed of to propel the implement in its operating condition in one direction, which towing means may be removed and availed of for towing the implement in another direction when it is desired to transport the same from place to place.

Other and further objects of the invention will be understood from a consideration of the specification appended hereto, and illustrated in the drawing wherein Figure 1 is a top plan view somewhat diagrammatic in nature showing the frame and parts carried thereby supported on the usual wheels, the auxiliary wheels and mounting illustrated in dotted lines.

Figure 2 is a side elevational view of the machine or implement shown in Figure 1.

Figure 3 is a view in front elevation of the machine shown in Figure 1.

Figure 4 is a somewhat enlarged fragmentary, partially sectional view illustrating the manner of attachment of the auxiliary wheel unit.

Figure 5 is a sectional view, also somewhat fragmentary, taken about on the line 5—5 of Figure 4 looking in the direction of the arrows.

Referring to the drawing, there is illustrated one form of machine which is particularly adaptable for use with the parts of this invention, same being in the form of a usual type of corn planter. As will be apparent, such a machine or implement is provided with a relatively long, narrow frame, which frame may be equipped as will be hereinafter described.

It should also be understood that the invention hereof is not limited for use with a corn planter but is intended primarily to be used with any implement which would not ordinarily be capable of being moved over a highway or street by the usual wheels with which the same is equipped.

Referring, therefore, to Figure 1 it will be noted that a frame generally designated 1 is substantially rectangular in nature, including the relatively long side members 2 and the shorter end members 3 and 4. Intermediate the end members 3 and 4 are the transverse members 5 and 6, the latter being provided in pairs in this particular instance. Such pairs of transverse members are further equipped with suitable bearings 7 and 8, likewise shown in pairs, between which and supported thereupon are the wheels 9 and 10.

Mounted above the frame and carried thereby are the usual hoppers 11, suitable mechanical parts being also furnished as indicated at 12, whereby the feed in the hoppers may be fed or dropped into the proper places as the machine progresses during its planting operation. Certain of the parts of the machine are omitted since they have no particular function as far as this invention is concerned and would only serve in an illustrative manner. As will be understood from the drawing of Figure 1, the frame 1 is intended to be moved at right angles to the axis of the wheels 9 and 10, and for such movement a tongue 13 is provided. The tongue 13 is normally fixed in such implements as they are furnished by the implement maker as a rigid member connected to the member 2. In this particular invention, the tongue 13 has been severed from the members 14 to which it was formerly fixed and is now connected to those members by means of the bolts and nuts 15. The purpose of the foregoing will be understood subsequently. As will usually be the case, the forward end of the tongue is provided with a suitable projection 16, whereby the implement may be attached to a tractor or the like for moving the same during its planting or other similar operation.

As is also shown in Figure 1, the tongue 13 is adapted to be moved into the dotted line position shown therein and attached by the bolts 15 to one of the end members, 4 for example, the end member 4 being equipped with suitable plates 17 for such purpose.

The attachment of this invention, largely comprises a transverse tubular member, generally indicated at 18 in Figure 1 and Figure 3, which member is secured to the longitudinal member 2 at the forward part of the machine, in any suitable manner such as by welding to such member as at 19. At the other longitudinal member 2, which is at the rear of the machine, a plate 20 is welded at one end to the frame, and in turn welded to the other end of the tubular member 18. The reason for the provision of the plate 20, is because of the peculiar elevational shape of the frame 1, which as will be seen in Figure 3, includes the member 2 at a somewhat higher elevation than the other member 2 at the forward end of the machine.

Since the tubular member 18 is hollow as will be clearly understood, and in this connection reference is had to Figures 4 and 5, it is suitable to receive therein a stub axle indicated at 21, which stub axle is offset at 22 for purposes which will be also set forth. At the outer end of the stub axle 21, a suitable backing plate 23 is provided, and also provision is made for an axle member upon which the wheel 24 may be rotatively mounted as by means of the bolts 25 provided.

An L-shaped pin member 26 is furnished, which is adapted to be entered in a suitable opening in the tubular member 18, and also through a co-mating opening in the stub axle member 21, to thus fix the axle member 21 with respect to the tubular member 18 and the frame to which the member 18 is affixed.

The reason for the offsetting of the axle 21 at 22 is apparent upon consideration of Figure 3 and also Figure 2 wherein with the axle 21 in place, it being apparent that a pair of the same is provided, the wheels 9 and 10 will be sufficiently raised from the ground so as to obviate interference therewith.

It will be also understood that the stub axles 21 together with the wheels 24 associated therewith may be removed from their position in the tubular member 18 to permit the implement to be supported by the wheels 9 and 10 for the usual planting or other operation for which the machine is particularly intended.

With the foregoing description of the various parts in mind, the peculiar advantages provided will be understood from a description of the manner of using the same.

It will be assumed that the implement and its frame 1 is as shown in Figure 1 in full lines and thus is in condition for operation as a corn planter. It will therefore be towed by the tongue 13, supported by the wheels 9 and 10 during such planting operation as the machine is propelled. Subsequently, if the machine is to be moved to a different location, at this time the stub axle 21 and its associated wheel 24 will be inserted in position as shown in the dotted lines at the top of Figure 1, the machine having been depressed at its forward end, so to speak, by means of the tongue 13, and tilting the machine on the axis of the wheels 9 and 10. The pin 26 is inserted in the proper openings and thus the said unit is in condition to support the weight of the machine. Thereafter the tongue 13 is raised at its forward end causing the wheel 24 presently in place to contact the ground. Thereafter, by suitably jacking up the longitudinal member 2 of the frame at the bottom of the disclosure of Figure 1, and the removal of the bolts 15, the tongue 13 may thereupon be removed. It is assembled at the end member 4 by means of the same bolts so as to lie in the dotted line position shown in Figure 1 at the left portion thereof. Thereafter, if the portion of the machine to which the tongue was formerly attached is raised to sufficient height another wheel and stub axle unit 21—24 may be positioned and a similar locking member 26 inserted to maintain the said unit in its proper position. Thereafter, of course, the jack or other raising instrumentality is removed, and thus the machine is supported by means of the wheels 24, the wheels 9 and 10 being raised above the ground. Subsequently, of course, the machine may be towed by means of the tongue now in place at the end member 4, to its future place of use.

It will be apparent that the effective width of the machine has been diminished by the foregoing procedure so that it may be properly towed upon the street or highway without interference with other traffic, in contrast to the previous condition in which the machine was normally available wherein the same would not be permitted to be moved over the road or highway by reason of its width.

When the machine has reached its future place of intended operation, of course the wheel units including the stub axles and wheels 24 will be removed, the tongue 13 replaced in its normal position, and the machine may be readily used thereafter.

Thus, there has been provided an implement transport arrangement which is simple in construction and readily available to effect the necessary transport of an implement whether the same be a corn planter or other similar machine, suitable provisions being made with simple attachable means for carrying out the purposes hereof.

Having thus described my invention, what I claim as new and desire to secure by Letters Patent of the United States, is:

1. In implement transport construction of the class described, in combination, an implement frame of relatively great width and short length, permanently mounted wheels for supporting the frame for movement in the lengthwise direction to perform the implement operation, said wheels being mounted within the confines of said frame and having axes extending in the direction of width, connections for towing instrumentalities to effect such movement, an axle engaging member connected to said frame at right angles to the axis of the permanently mounted wheels, towing instrumentalities for said frame, connections at the short portion of the frame to which the towing instrumentalities are removably attached, and a pair of wheels having offset stub axles removably mounted in the axle member whereby the implement may be transported in a direction at right angles to the implement operation direction, said offset axles providing for positioning the permanently mounted wheels out of engagement with the ground.

2. The combination as claimed in claim 1, wherein the axle engaging member is tubular, the stub axles are tubular and extend outwardly beyond the frame, are received in said member and readily demountable therefrom, and positioning connecting devices engage the axles and member.

References Cited in the file of this patent

UNITED STATES PATENTS

| | | |
|---|---|---|
| 1,319,235 | Messersmith | Oct. 21, 1919 |
| 1,642,502 | Krasberg | Sept. 13, 1927 |
| 1,872,121 | Christensen | Aug. 16, 1932 |
| 1,941,539 | Court et al. | Jan. 2, 1934 |
| 2,631,898 | Long | Mar. 17, 1953 |